United States Patent [19]

Joe

[11] Patent Number: 5,808,212

[45] Date of Patent: Sep. 15, 1998

[54] APPARATUS FOR TESTING COMPONENTS TO BE INCORPORATED IN A VIDEO CASSETTE RECORDER

[75] Inventor: Yeo-Uk Joe, Seoul, Rep. of Korea

[73] Assignee: Daewoo Electronics Co., Ltd., Rep. of Korea

[21] Appl. No.: 764,120

[22] Filed: Dec. 9, 1996

Related U.S. Application Data

[63] Continuation of Ser. No. 618,740, Mar. 20, 1996, Pat. No. 5,700,960.

[30] Foreign Application Priority Data

Mar. 31, 1995 [KR] Rep. of Korea .................... 1995-6260

[51] Int. Cl.$^6$ ...................................................... G11B 5/54
[52] U.S. Cl. ............................................................. 73/865.9
[58] Field of Search .............................. 73/865.6, 865.8, 73/865.9; 360/85, 95, 137, 90, 93, 96.1, 130.3, 130.31, 130.32, 130.33

[56] References Cited

U.S. PATENT DOCUMENTS 4,309,733  1/1982  Tomabechi ............................. 360/96.1
4,344,096  8/1982  Tanaka et al. ............................ 360/93
4,797,758  1/1989  Yamaguchi et al. .

Primary Examiner—Robert Raevis
Attorney, Agent, or Firm—Pennie & Edmonds LLP

[57] ABSTRACT

An apparatus for testing components to be inserted in a video cassette recorder or digital video cassette recorder includes a base provided with a pair of guide rails, a stationary plate, a first and a pair of second driven plates moving along the guide rails, and a capstan motor holder on which a capstan shaft and a hinge pin are mounted. The pinch roller lever assembly is provided with a pivot arm pivotably mounted to the hinge pin, a pinch roller rotatably mounted on the pivot arm, a lever and a coil spring, wherein one end of the lever is rotatably fixed near the pinch roller on the pivot arm and the other end is provided with a protrusion and a substantial ellipse-shaped ring, both ends of the coil spring are secured to the protrusion of the lever and the boss of the second driven plate, respectively.

10 Claims, 4 Drawing Sheets

APPARATUS FOR TESTING COMPONENTS TO BE INCORPORATED IN A VIDEO CASSETTE RECORDER

This is a continuation, of application Ser. No. 08/618,740, filed Mar. 20, 1996, now U.S. Pat. No. 5,700,960.

FIELD OF THE INVENTION

The present invention relates to an apparatus for testing components to be incorporated in a video cassette recorder ("VCR") or a digital video cassette recorder ("DVCR"); and, more particularly, to the testing apparatus including a pinch roller lever assembly with a simplified structure which enables a pinch roller therein to press a running magnetic tape against a capstan shaft without any malfunctioning.

DESCRIPTION OF THE PRIOR ART

In a manufacturing process of a VCR or a DVCR, certain components to be incorporated therein are usually tested before they are set therein. Particularly, in case of manufacturing a DVCR, based on the testing, it may become necessary to change the size, inclination, position, etc. of, e.g., a head drum and a loading post. For the purpose, therefore, an apparatus for testing components to be incorporated in the VCR or DVCR is after used.

There is disclosed in Korean Utility Model Application No. 94-34267 such an apparatus for testing components to be incorporated in a VCR or DVCR.

The prior art test apparatus includes a base 10 provided with a pair of guide rails 11, a stationary plate 20, a first driven plate 40, a pair of second driven plates 50, 50', a pair of pole bases 30, a capstan motor holder 80, a driving means 60 for reciprocating the first driven plate 40 and hence the second driven plates 50, 50', and a pinch roller lever assembly 90.

The guide rails 11 are spaced from and parallel to each other on the base 10.

There are mounted on the stationary plate 20 a pair of reel tables 22 and a head drum 21 including a rotary and a stationary drums.

Each of the second driven plates 50, 50' is interlocked to the first driven plate 40 through an elastic member 70.

On each of the pole bases 30, a pair of loading posts 31 is installed and the pole bases 30 are mounted on both inside surfaces of the second driven plates 50, 50', respectively.

In addition, there are fixed on the capstan motor holder 80 a capstan motor (not shown) with a capstan shaft 27 and a hinge pin 81.

The pinch roller lever assembly 90 is provided with a pinch roller 26, an upper part 29 with a slot and a guide pin (not shown) protruding downwardly from a bottom surface thereof, a lower part 28 with a protrusion, and a coil spring 33, wherein the pinch roller 26 is rotatably mounted on the lower part 28, the lower and the upper parts 28, 29 are, in turn, pivotably mounted on the hinge pin 81 in such a way that the protrusion is fitted into the slot and they are connected to each other through the coil spring 33. Further, the guide pin of the upper part 29 is fitted into a guide groove 51 formed on the second driven plate 50' close to the capstan shaft 27.

When a tape cassette is loaded onto the reel tables 22, the first driven plate 40, and hence the second driven plates 50, 50', move along the guide rails 11 by the driving means 60 in a forward direction as indicated with an arrow shown in FIG. 1. The pole bases 30 move to both side positions adjacent to the head drum 21, respectively, according to the movement of the second driven plates 50, 50', thereby wrapping a magnetic tape around the head drum 21.

On the other hand, as the second driven plate 50' moves, the guide pin of the pinch roller lever assembly 90 also moves along the guide groove 51 thereon, thereby allowing the pinch roller lever assembly 90 to pivot about the hinge pin 81 and enabling the pinch roller 26 to press the magnetic tape against the capstan shaft 27. This makes it possible to keep a tape tension constant during the reproduction of signals recorded on the tape. During the reproduction process, a plurality of heads incorporated in the head drum read the signals, which are, in turn, displayed on a monitor (not shown) electrically connected to the apparatus.

As a result of the test, if desired, the position, inclination, height, size, etc. of certain components may be changed before they are set into the VCR or DVCR.

However, in such a prior art test apparatus, the pinch roller lever assembly 90 has a large number of components so that it is rather difficult and cumbersome to put them together. In addition, the guide pin is apt to deviate from the guide groove on the second driven plate 50' during a movement thereof, thereby preventing or hampering the pinch roller 26 from properly pressing the running magnetic tape against the capstan shaft 27.

SUMMARY OF THE INVENTION

It is, therefore, a primary object of the invention to provide an apparatus for testing components to be incorporated in a VCR or DVCR, which includes a pinch roller lever assembly with a simplified structure enabling a pinch roller to press a running magnetic tape against a capstan shaft without any malfunctioning.

In accordance with one aspect of the present invention, there is provided an apparatus for testing components to be incorporated in a video cassette recorder or digital video cassette recorder, which comprises: a base provided with a pair of guide rails, wherein the guide rails are spaced from and parallel to each other on the base; a stationary plate on which a pair of reel tables and a head drum including a rotary and a stationary drums are installed, the stationary plate being mounted between the guide rails on the base; a pair of pole bases on each of which a pair of loading posts is installed; a capstan motor holder on which a capstan shaft and a hinge pin are mounted, the capstan motor holder being mounted on the base; a first driven plate and a pair of second driven plates moving along the guide rails, wherein the pole bases are mounted on both inside lateral surfaces of the second driven plates, and, in response to a movement of the second driven plates, move to both side positions adjacent to the head drum, respectively, and one of the second driven plates closer to the capstan shaft is provided with a boss; a driving means for reciprocating the first driven plate and hence the second driven plates; and a pinch roller lever assembly provided with a pivot arm pivotably mounted to the hinge pin, a pinch roller rotatably mounted on the pivot arm, a lever and a coil spring, wherein one end of the lever is rotatably fixed near the pinch roller on the pivot arm and the other end is provided with a holding means and a substantially ellipse-shaped ring, the boss of the second driven plate being inserted into the substantially ellipse-shaped ring, both ends of the coil spring being secured to the holding means of the lever and the boss of said one of the second driven plates, respectively.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
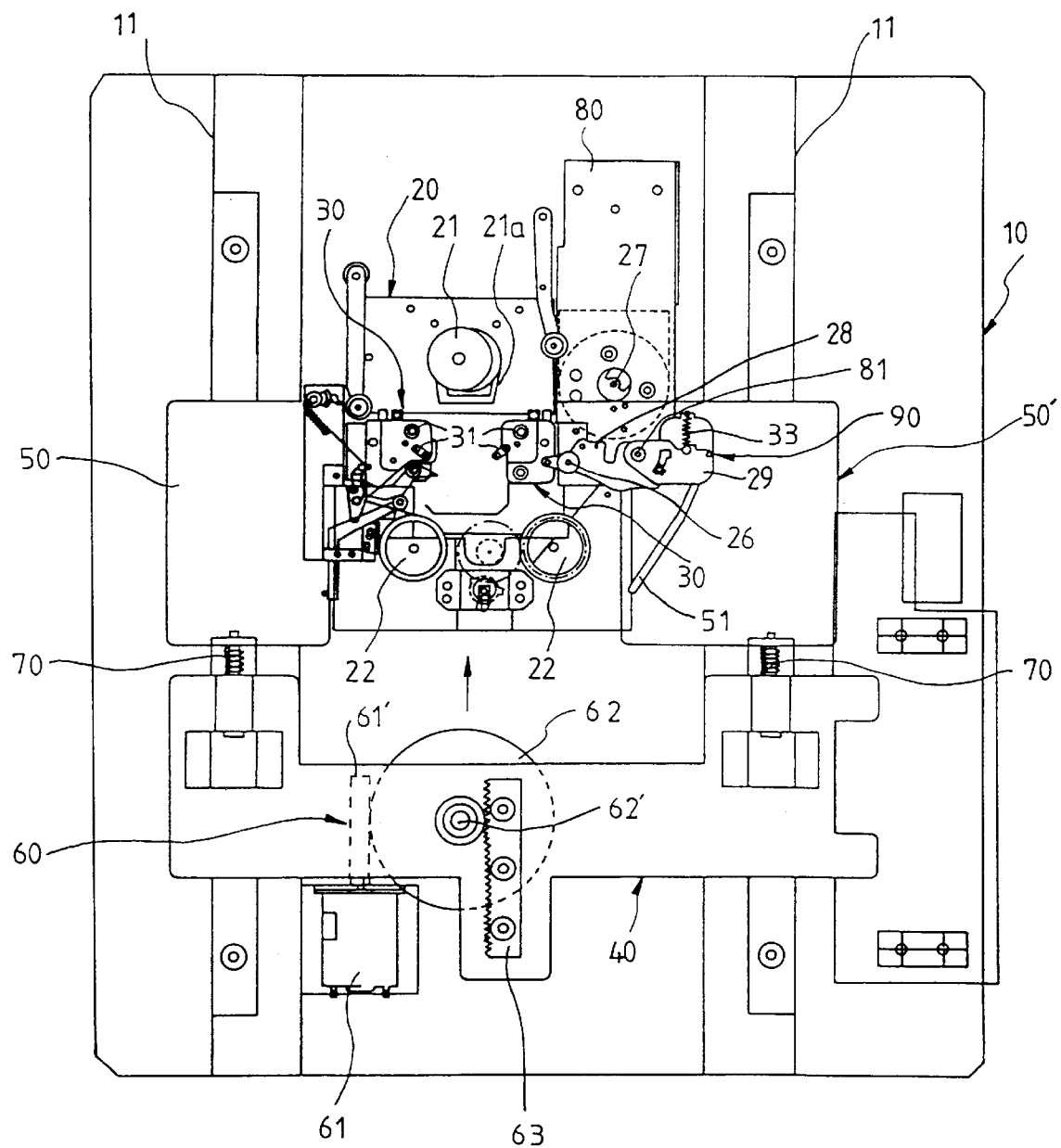
FIG. 1 shows a schematic top view of a conventional apparatus for testing components to be installed in a VCR or DVCR.
Figure 2:
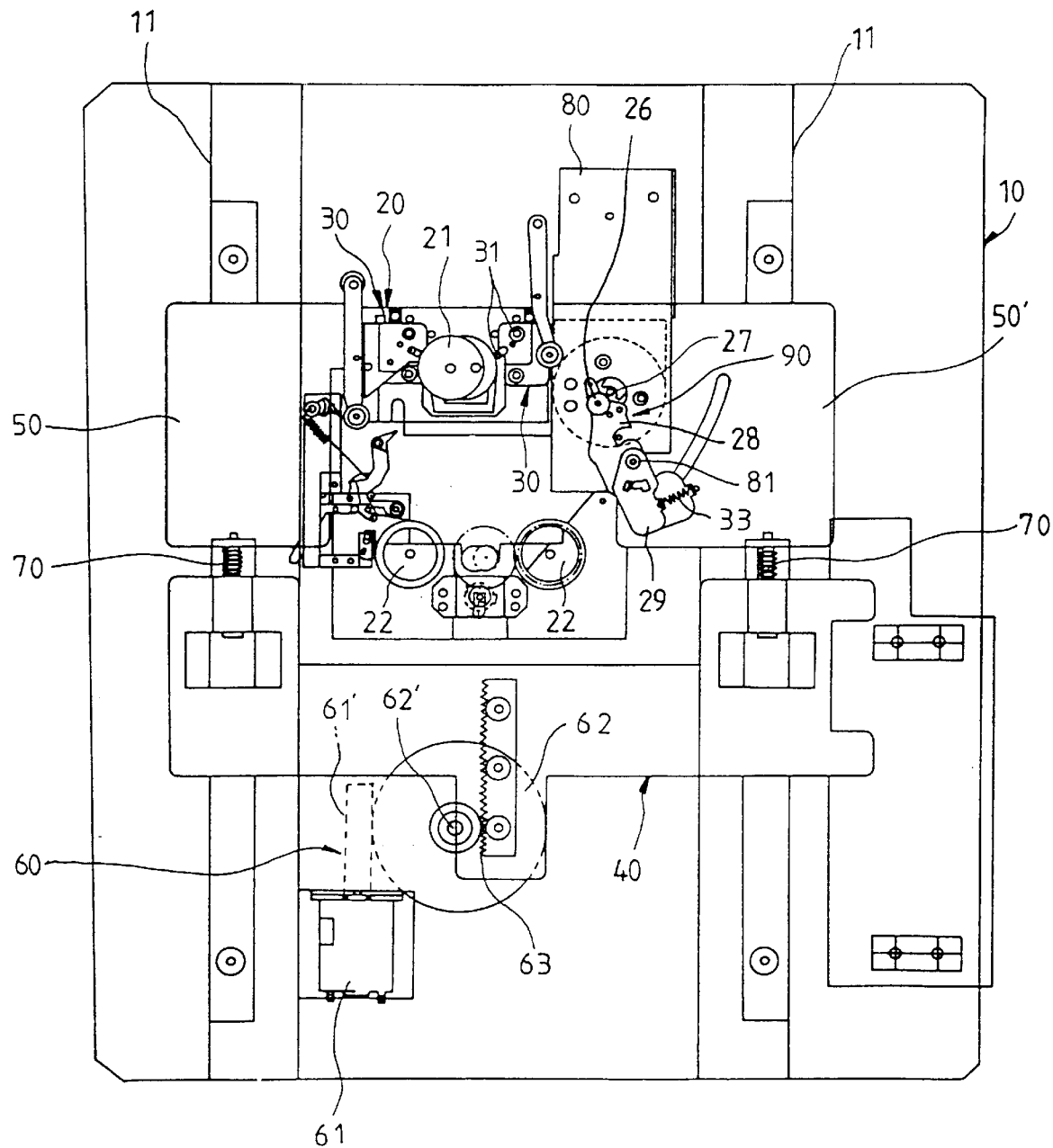
FIG. 2 represents a schematic top view of the conventional test apparatus of FIG. 1, wherein the first and the second driven plates are moved so as to have the pinch roller press the capstan shaft.
Figure 3:
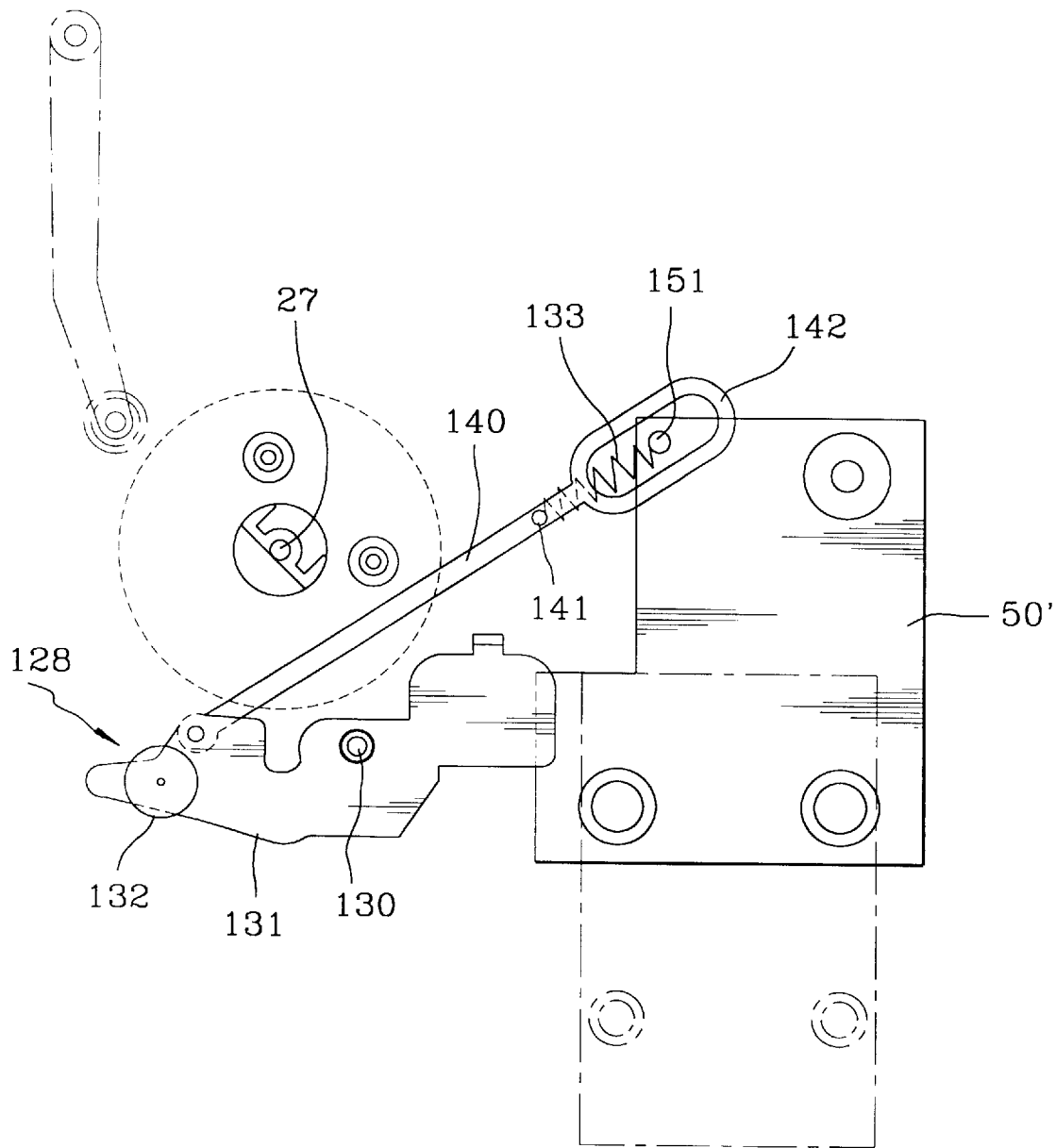
FIG. 3 illustrates a partial detailed top view of an apparatus for testing components in accordance with a preferred embodiment of the present invention, mainly showing the pinch roller lever assembly.
Figure 4:
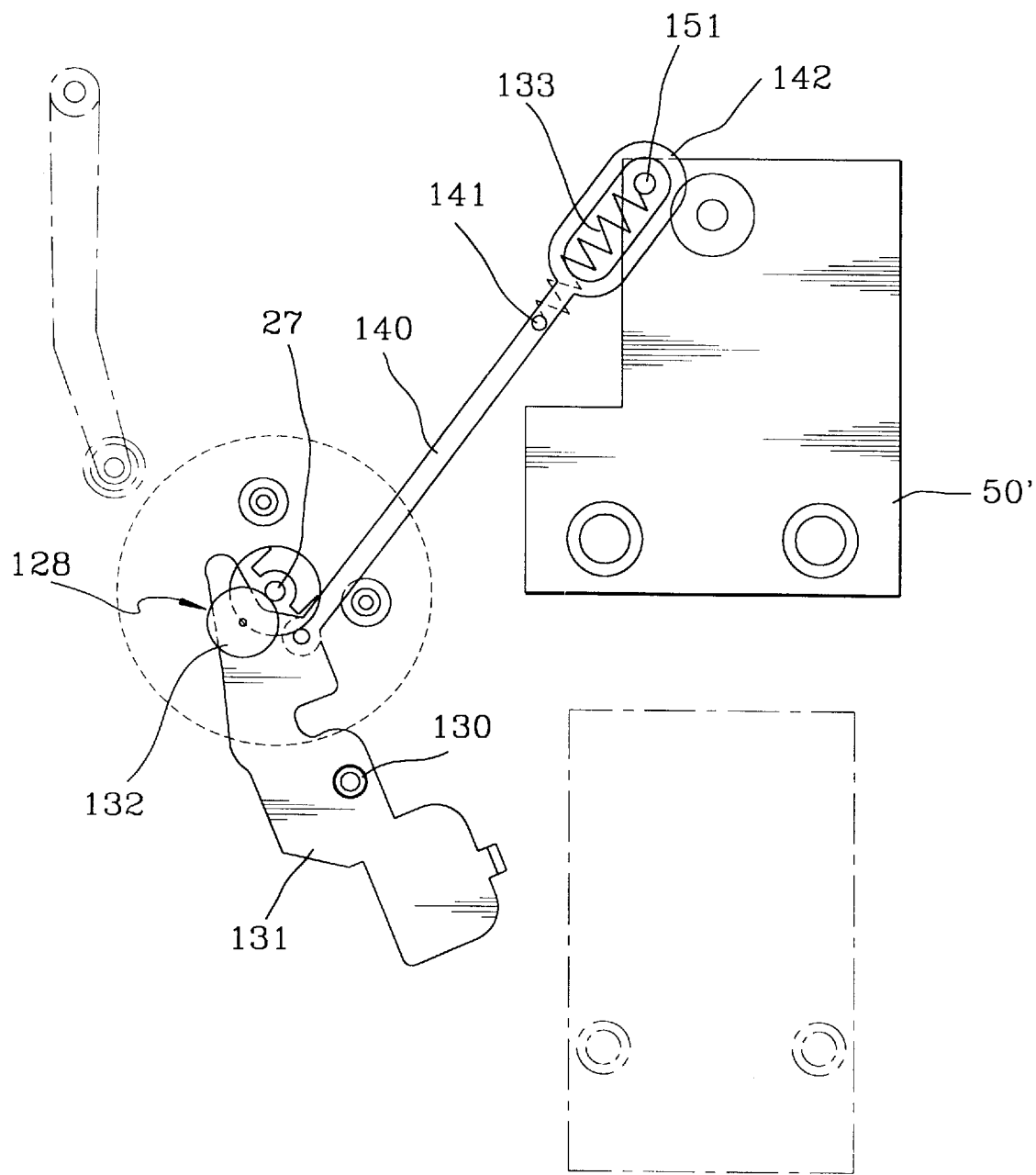
FIG. 4 depicts a partial detailed top view of the inventive test apparatus, wherein the pinch roller presses a running magnetic tape loaded therein against the capstan shaft according to a movement of the second driven plates.

Although the main aspect of an apparatus for testing components to be installed in a VCR or DVCR in accordance with a preferred embodiment of the present invention is shown in FIGS. 3 and 4, FIGS. 1 and 2 will be from time to time referenced in describing the inventive test apparatus. Furthermore, like reference numerals representing like components are used throughout FIGS. 1 to 4.

The inventive test apparatus includes a base 10 provided with a pair of guide rails 11, a stationary plate 20, a first driven plate 40, a pair of second driven plates 50, 50', a pair of pole bases 30, a capstan motor holder 80 and a driving means 60 for driving the first driven plate 40 and the second driven plates 50, 50', and a pinch roller lever assembly 128.

The guide rails 11 are spaced from and parallel to each other on the base 10.

There are installed on the stationary plate 20 a pair of reel tables 22 and a head drum 21 including a rotary and a stationary drums. The stationary plate 20 is mounted between the guide rails 11 on the base 10.

Each of the second driven plates 50, 50' is interlocked to the first driven plate 40 through an elastic member 70. The second driven plate 50' closer to the capstan shaft is provided with a boss 151.

The pole bases 30 are mounted on both inside surfaces of the second driven plates 50, 50', respectively. There are installed on each of the pole bases 30 a pair of loading posts 31 one of which is slanted.

The driving means 60 is provided with a motor 61, a worm wheel 62, and a rack 63. The motor 61 has a worm 61', the worm wheel 62 being engaged with the worm 61'. The rack 63 is mounted on the first driven plate 40, being engaged with the worm wheel 62 through an intermediate gear 62' at the opposite side of the worm 61', and reciprocates in a longitudinal direction thereof, thereby reciprocating the first driven plate 40 and the second driven plates 50, 50'.

On the other hand, there are fixed on the capstan motor holder 80 a capstan motor (not shown) with a capstan shaft 27 and a hinge pin 130, and the capstan motor holder 80 is mounted between the guide rails 11 on the base 10.

The pinch roller lever assembly 128 is provided with a pivot arm 131, a pinch roller 132 rotatably mounted on the pivot arm 131, a lever 140 and a coil spring 133. The pivot arm 131 is pivotably mounted to the hinge pin 130. One end of the lever 140 is rotatably fixed near the pinch roller 132 on the pivot arm 131 and the other end is provided with a protrusion 141 and a substantially ellipse-shaped ring 142. It is preferable that the ring 142 be integrally formed with the lever 140. The ellipse-shaped ring 142 has an inside space into which the boss 151 of the second driven plate 50' is loosely inserted, and both ends of the coil spring 133 are secured to the protrusion 141 of the lever 140 and the boss 151 of the second driven plate 50, respectively, thereby allowing the pinch roller 132 to resiliently press a magnetic tape against the capstan shaft 27 during the reproduction of signals recorded on the tape.

When a tape cassette is loaded onto the reel tables 22, the first driven plate 40 and the second driven plates 50, 50', move along the guide rails 11 by the driving means 60 in a forward direction as indicated with an arrow shown in FIG. 1. In response to the movement of the second driven plates 50, 50', the pole bases 30 fixed thereto move to both side positions adjacent to the head drum 21, respectively, thereby having the loading posts 31 wrap a magnetic tape around the head drum 21. During the movement of the second driven plates 50, 50', the boss 151 of the second driven plate 50' draws the lever 140 through the coil spring 133 and pivots the pivot arm 131 so that the pinch roller 132 presses the magnetic tape against the capstan shaft 27, thereby keeping a tape tension constant during the reproduction of signals recorded on the tape. On the other hand, during the reproducing of signals, a plurality of heads incorporated in the head drum assembly read the signals, which are, then, displayed on a monitor (not shown) electrically connected to the apparatus.

As a result of the test, if desired, the position, inclination, height, size, etc. of certain components such as the head drum 21 and the loading posts 31 may be changed before they are set into the VCR or DVCR.

The test apparatus of the present invention includes the simplified pinch roller lever assembly, thereby facilitating the assembly thereof. In addition, it enables the pinch roller to press the magnetic tape against the capstan shaft without deviation of the guide pin from the guide groove as observed in the prior art.

Although the invention has been shown and described with respect to the preferred embodiments, it will be understood by those skilled in the art that various changes and modifications may be made without departing from the spirit and scope of the invention as defined in the following claims.

What is claimed is:

1. An apparatus for testing components to be incorporated in a video cassette recorder, which comprises:

a stationary plate to which a capstan shaft and a stationary hinge pin are mounted;

a moving plate;

a pivot arm pivotally mounted to said stationary hinge pin;

a roller mounted on a first end of said pivot arm; and a lever pivotally fixed at a first end to said first end of said pivot arm, said lever being resiliently and rotatably connected at a second end to said moving plate, wherein in a rest position said roller is disposed at a predetermined distance from said capstan shaft, said roller being movable to an engaged position when said moving plate is moved such that said lever resiliently applies a force on said pivot arm to rotate said pivot arm about said hinge pin to bring said roller into pressure contact with said capstan shaft.

2. The apparatus according to claim 1, wherein a resilient spring is secured at a first end to said lever and at a second end to said moving plate.

3. The apparatus according to claim 2, wherein said spring is secured to a boss disposed on said moving plate.

4. The apparatus according to claim 3, wherein said lever comprises a ring at its second end, and wherein said boss is received inside said ring.

5. The apparatus according to claim 4, wherein said ring has a substantially ellipse shape and is formed integrally with said lever.

6. A pinch roller assembly for pressuring a magnetic tape against a capstan shaft, said pinch roller assembly comprising:

a pivot arm pivotally mounted to a stationary hinge pin;

a roller mounted on a first end of said pivot arm; and a lever pivotally fixed at a first end to said first end of said pivot arm, the lever being resiliently and rotatably connected at a second end to a moving plate, wherein in a rest position the roller is disposed at a predetermined distance from the capstan shaft, said roller is movable to an engaged position when said moving plate is moved such that the lever resiliently applies a force on said pivot arm to rotate said pivot arm about the stationary hinge pin to bring the roller into pressure contact with said capstan shaft.

7. The assembly according to claim 6, wherein a resilient spring is secured at a first end to the lever and at a second end to the moving plate.

8. The assembly according to claim 7, wherein the spring is secured to a boss disposed on the moving plate.

9. The assembly according to claim 8, wherein the lever comprises a ring at its second end, and wherein said boss is received inside said ring.

10. The assembly according to claim 9, wherein said ring has a substantially ellipse shape and is formed integrally with the lever.

* * * * *